(12) United States Patent
Hamlin

(10) Patent No.: US 6,973,570 B1
(45) Date of Patent: Dec. 6, 2005

(54) INTEGRATED CIRCUIT COMPRISING ENCRYPTION CIRCUITRY SELECTIVELY ENABLED BY VERIFYING A DEVICE

(75) Inventor: Christopher L. Hamlin, Los Gatos, CA (US)

(73) Assignee: Western Digital Ventures, Inc., Lake Forest, CA (US)

(*) Notice: Subject to any disclaimer, the term of this patent is extended or adjusted under 35 U.S.C. 154(b) by 0 days.

(21) Appl. No.: 09/477,107

(22) Filed: Dec. 31, 1999

(51) Int. Cl.[7] ............................................. H04L 9/00
(52) U.S. Cl. ..................... 713/168; 713/170; 713/189; 713/193; 713/200; 380/1; 380/28
(58) Field of Search .............................. 713/123, 168, 713/170, 154, 189, 193, 200; 380/9, 23, 4, 380/1, 28, 29

(56) References Cited

U.S. PATENT DOCUMENTS

| | | | | |
|---|---|---|---|---|
| 5,251,304 A | * | 10/1993 | Sibigtroth et al. | 713/200 |
| 5,343,525 A | * | 8/1994 | Hung et al. | 713/193 |
| 5,592,555 A | | 1/1997 | Stewart | |
| 5,595,555 A | | 1/1997 | Chen | |
| 5,687,237 A | | 11/1997 | Naclerio | |
| 5,694,469 A | * | 12/1997 | Le Rue | 705/51 |
| 5,734,819 A | * | 3/1998 | Lewis | 713/200 |
| 5,857,025 A | | 1/1999 | Anderson et al. | |
| 5,883,958 A | | 3/1999 | Ishiguro et al. | |
| 5,892,826 A | * | 4/1999 | Brown et al. | 713/190 |
| 5,915,018 A | | 6/1999 | Aucsmith | |
| 5,920,690 A | | 7/1999 | Moyer et al. | |
| 5,931,947 A | | 8/1999 | Burns et al. | |
| 6,026,293 A | * | 2/2000 | Osborn | 455/411 |
| 6,035,429 A | | 3/2000 | Shafe | |
| 6,073,236 A | * | 6/2000 | Kusakabe et al. | 713/169 |
| 6,088,802 A | | 7/2000 | Bialick et al. | |
| 6,304,658 B1 | * | 10/2001 | Kocher et al. | 380/30 |
| 6,360,321 B1 | * | 3/2002 | Gressel et al. | 713/172 |
| 6,473,861 B1 | | 10/2002 | Stokes | |
| 6,546,489 B1 | | 4/2003 | Frank, Jr. | |
| 6,735,693 B1 | * | 5/2004 | Hamlin | 713/168 |

FOREIGN PATENT DOCUMENTS

GB     EP 0911 738 A2  *  4/1999   .......... G06F 12/14

OTHER PUBLICATIONS

Hans Eberle, "A High-Speed DES Implementation For Network Applications", Technical Report 90, DEC System Research Center, Sep. 1992.

Tygar, J.D. and Yee, B.S., "Secure Coprocessors in Electronic Commerce Applications", Proceedings 1995 USENIX Electronic Commerce Workshop, 1995, New York.

(Continued)

*Primary Examiner*—Kim Vu
*Assistant Examiner*—Beemnet W Dada
(74) *Attorney, Agent, or Firm*—Howard H. Sheerin, Esq.

(57) ABSTRACT

An integrated circuit is disclosed for selectively encrypting plaintext data received from a first device to produce encrypted data to send to a second device. The integrated circuit comprises controllable encryption circuitry comprising a data input, an enable input, and a data output. The integrated circuit further comprises a plaintext input for providing the plaintext data to the data input, an encrypted text output for providing the encrypted data from the data output, and a first control input for receiving a first device authentication signal for authenticating the first device. The integrated circuit further comprises a verification circuit responsive to the first device authentication signal for producing a first verification signal for use in controlling the enable input of the encryption circuitry to enable the encryption circuitry to provide the encrypted data via the encrypted text output.

14 Claims, 3 Drawing Sheets

OTHER PUBLICATIONS

Bennet Yee, J.D. Tygar, "Secure Coprocessors in Electric Commerce Applications", First USENIX Workshop on Electronic Commerce, Jul. 11-12, 1995, 155-170.

Bruce Schneier, "Applied Cryptography Second Edition: protocols, algorithms, and source code in C", 1996, 1-9 & 409-413, John Wiley & Sons, Inc., USA.

Hans Eberle, "A High-speed DES Implementation For Network Applications", digital Systems Research Center, Sep. 23, 1992, 1-24.

Garth A. Gibson, David F. Nagle, Khalil Amiri, Fay W. Chang, Howard Gobioff, Erik Riedel, David Rochberg, and Jim Zelenka, "Filesystems for Network-Attached Secure Disks", Jul. 1997, 1-18, CMU-CS-97-118, School of Computer Science, Carnegie Mellon University, Pittsburgh, Pennsylvania 15213-3890.

Howard Gobioff, Garth Gibson, and Doug Tygar, "Security for Network Attached Storage Devices", Oct. 23, 1997, 1-18, CMU-CS-97-185, School of Computer Science, Carnegie Mellon University, Pittsburgh, PA 15213.

David Nagle and Joan Digney, "NASD-Implementation", http://www.pdl.cs.cmu.edu/NASD/, Nov. 19, 1998, 1-2, NASD at CMU.

David Nagle and Joan Digney, "NASD-Extreme NASD", http://www.pdl.cs.cmu.edu/NASD/highlights97.html, Jun. 10, 1999, 1-6, NASD at CMU.

Howard Gobioff, "Security for a High Performance Commodity Storage Subsystem", School of Computer Science, Carnegie Mellon University, CMU-CS-99-160, Jul. 1999, pp. 171-178.

* cited by examiner

INTEGRATED CIRCUIT COMPRISING ENCRYPTION CIRCUITRY SELECTIVELY ENABLED BY VERIFYING A DEVICE

BACKGROUND OF THE INVENTION

1. Field of the Invention

The present invention relates to encryption circuitry. More particularly, the present invention relates to an integrated circuit comprising encryption circuitry selectively enabled by verifying a device.

2. Description of the Prior Art

Cryptosystems are typically secure as long as attackers cannot discover the secret keys used to encrypt and decrypt messages. Attackers use various cryptanalysis techniques to analyze a cryptosystem in an attempt to discover the secret keys, where the difficulty in discovering the secret keys generally depends on the amount of information available. The cryptosystem typically employs a public encryption algorithm (such as RSA, DES, etc.), therefore an attacker typically knows the encryption algorithm and has access to ciphertext (encrypted text). However, it is usually very difficult to discover the secret keys with this information alone because an attacker typically needs to perform various operations on the ciphertext with respect to the original plaintext (unencrypted text). A known cryptanalysis technique includes monitoring a cryptosystem to capture plaintext before it is encrypted so that it can be analyzed together with the ciphertext. Another cryptanalysis technique includes performing a chosen plaintext attack by choosing the plaintext that is to be encrypted so as to expose vulnerabilities of a cryptosystem because the attacker can deliberately pick patterns helpful to analysis contributing to discovering the secret keys. This type of an attack can be defended against by requiring the individual clients accessing the cryptosystem to be authenticated. However, an attacker with direct access to a cryptosystem may attempt to circumvent such a requirement by tampering with the cryptosystem. Examples of tampering include inspecting, altering or replacing a component of the cryptosystem in order to force the encryption operation.

U.S. Pat. No. 5,734,819 (the '819 patent) discloses a software program executing on a CPU which provides system operation validation in order to prevent the software program from executing on unlicensed computer systems. The validation method requires reading a unique chip identifier (chip ID) stored in a system device, and a corresponding chip ID and an encrypted code stored in a non-volatile memory. The encrypted code, termed a message authentication code or MAC, is generated based on the chip ID using a secret key. The '819 patent relies on uncompromised secrecy of the secret key to prevent tampering which could circumvent the validation process.

The '819 patent is susceptible to a probing attacker attempting to discover the secret key by performing a chosen plain-text attack. For example, a probing attacker could tamper with the cryptosystem to generate chosen plaintext by modifying the chip ID stored in the non-volatile memory and then evaluate the resulting MAC generated by the encryption process. Further, a probing attacker could monitor the software program as it executes on the CPU in order to observe how the chosen plaintext is being encrypted using the secret key. If the secret key is discovered, the security of the system is compromised since the chip ID and corresponding MAC could be altered without detection.

There is, therefore, a need for a tamper resistant cryptosystem which is protected from an attacker employing chosen plaintext attacks.

SUMMARY OF THE INVENTION

The present invention may be regarded as an integrated circuit for selectively encrypting plaintext data received from a first device to produce encrypted data to send to a second device. The integrated circuit comprises controllable encryption circuitry comprising a data input, an enable input, and a data output. The integrated circuit further comprises a plaintext input for providing the plaintext data to the data input, an encrypted text output for providing the encrypted data from the data output, and a first control input for receiving a first device authentication signal for authenticating the first device. The integrated circuit further comprises a verification circuit responsive to the first device authentication signal for producing a first verification signal for use in controlling the enable input of the encryption circuitry to enable the encryption circuitry to provide the encrypted data via the encrypted text output.

The present invention may also be regarded as a method of controlling encryption circuitry within an integrated circuit by selectively encrypting plaintext data received from a first device to produce encrypted data to send to a second device. The method comprises the steps of receiving the plaintext data from the first device, receiving a first device authentication signal for authenticating the first device, producing a first verification signal in response to the first device authentication signal, enabling the encryption circuitry in response to the first verification signal to provide the encrypted data to the second device.

DESCRIPTION OF THE PREFERRED EMBODIMENTS

System Overview

Figure 1:
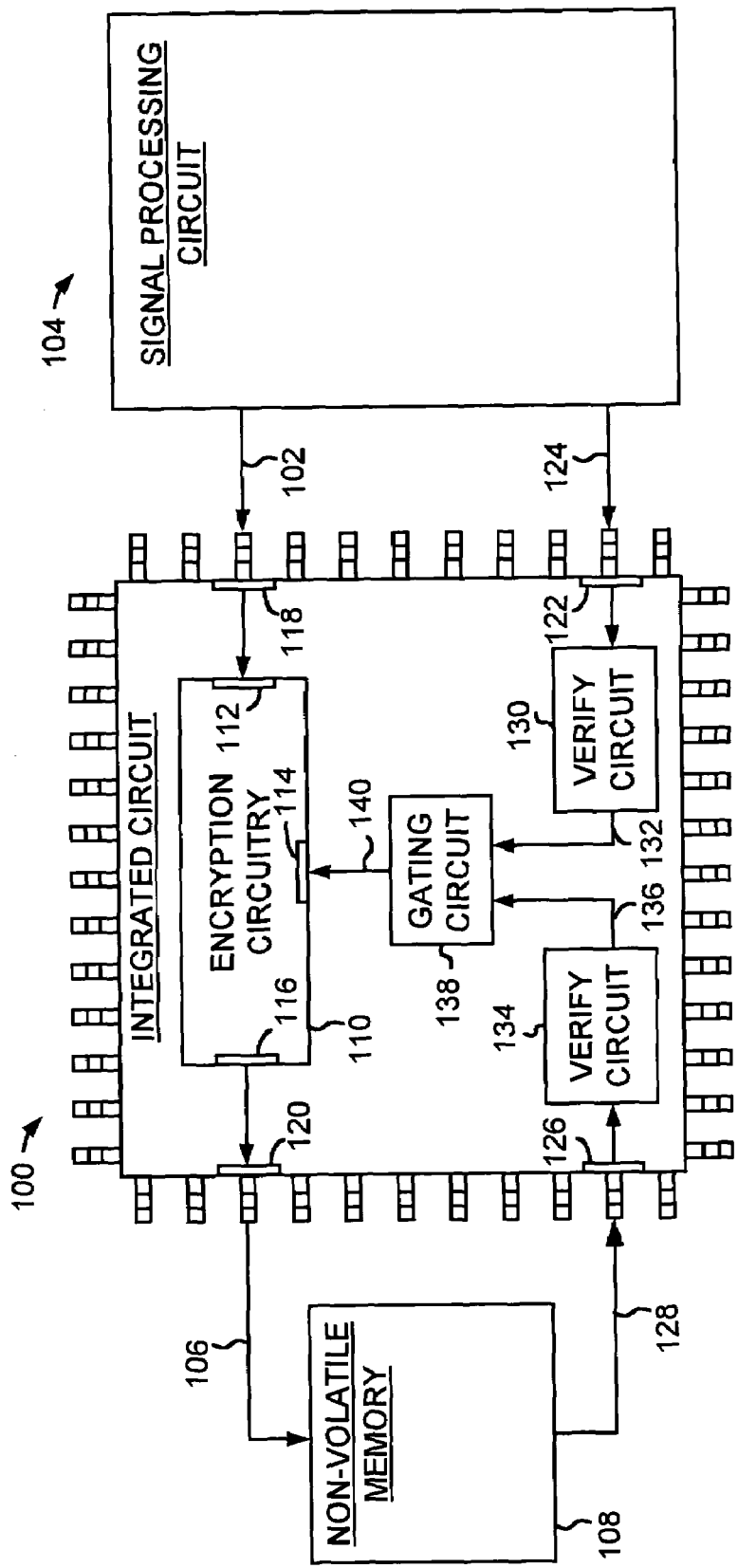
FIG. 1 shows an embodiment of the present invention comprising a first device for providing plaintext data to an integrated circuit comprising an encryption circuit selectively enabled by a first device authentication signal generated by the first device, and a second device for receiving the encrypted data from the integrated circuit.

FIG. 1 shows an embodiment of the present invention comprising an integrated circuit 100 for selectively encrypting plaintext data 102 received from a first device 104 to produce encrypted data 106 to send to a second device 108. The integrated circuit 100 comprises controllable encryption circuitry 110 comprising a data input 112, an enable input 114, and a data output 116. The integrated circuit 100 further comprises a plaintext input 118 for providing the plaintext data 102 to the data input 112, an encrypted text output 120 for providing the encrypted data 106 from the data output 116, and a first control input 122 for receiving a first device authentication signal 124 for authenticating the first device 104. A first verification circuit 130, responsive to the first device authentication signal 124, produces a first verification signal 132 for use in controlling the enable input 114 of the encryption circuitry 110 to enable the encryption circuitry 110 to provide the encrypted data 106 via the encrypted text output 120.

The encryption circuitry 110 in the integrated circuit 100 will not operate unless the first device 104 has been verified which protects against a probing attacker tampering with the first device 104 in an attempt to perform a chosen plaintext attack. Further, the first device 104 will preferably not generate the first device authentication signal 124 unless a command to encrypt data is received by an authenticated client. This protects against an unauthenticated attacker attempting to observe the first device authentication signal 124. Additional protection against observation may be provided by concealing the first device authentication signal 124 to deter probing, or by detecting an attacker's probing by, for example, monitoring changes to the impedance of the first device authentication signal 124. In an alternative embodiment discussed below, a message authentication code (MAC) is employed to protect against a chosen plaintext attack in the event that an attacker is able to observe the first device authentication signal 124. In yet another embodiment, a means is provided to verify the validity of the firmware executed by the first device 104. For example, a CRC check code may be generated for the firmware during manufacturing which is then verified during operation before generating the first device authentication signal 124. This protects against a probing attacker who tampers with the executable code in an attempt to force the first device 104 to generate the first device authentication signal 124.

To provide further protection against a probing attacker, in one embodiment both the integrated circuit 100 and the first device 104 are implemented using tamper-resistant encryption circuitry. An example discussion of tamper-resistant encryption circuitry is provided in Tygar, J. D. and Yee, B. S., "Secure Coprocessors in Electronic Commerce Applications," Proceedings 1995 USENIX Electronic Commerce Workshop, 1995, New York, which is incorporated herein by reference.

In another embodiment, the integrated circuit 100 comprises a second control input 126 for receiving a second device authentication signal 128 for authenticating the second device 108, and a second verification circuit 134 responsive to the second device authentication signal 128 for producing a second verification signal 136. A gating circuit 138 responsive to the first and second verification signals 124 and 128 applies an enable signal 140 to the enable input 114 to cause the controllable encryption circuitry 110 to provide the encrypted data 106 via the encrypted text output 120. In this embodiment, the encryption circuitry 110 in the integrated circuit 100 will not operate unless both the first device 104 and the second device 108 have been verified.

In the embodiment of FIG. 1, a cryptosystem comprises first device 104, integrated circuit 100, and second device 108, wherein the first device 104 comprises a signal processing circuit and the second device 108 comprises a non-volatile memory. For example, in one embodiment a disk drive comprises a signal processing circuit 104 (e.g., a disk control system), a disk 108, and an integrated circuit 100 comprising encryption circuitry 110. The disk drive preferably comprises a head disk assembly (HDA) and a printed circuit board (PCB), where the integrated circuit 100 can be located within the HDA or on the PCB. The encryption circuitry 110 implements a suitable cipher, such as the well known symmetric Data Encryption Standard (DES) or the asymmetric Rivest-Shamir-Adleman (RSA) algorithm. The encryption circuitry 110 is preferably implemented using suitable hardware, such as a family of linear feedback shift registers (LFSR) and other digital logic. An example of a hardware implementation of encryption circuitry is provided by Hans Eberle in "A High-Speed DES Implementation for Network Applications," Technical Report 90, DEC System Research Center, September 1992, the disclosure of which is herein incorporated by reference.

Device Verification

The first device 104 in FIG. 1 can be verified by incorporating within the first device 104 a unique device identifier which is transferred to the integrated circuit 100 as the first device authentication signal 124 whenever a request is received from an authenticated client to encrypt plaintext 102. In one embodiment, the first verification circuit 130 within the integrated circuit 100 comprises a comparator for comparing the device identifier received over line 124 with a corresponding expected device identifier. A match verifies that the first device 104 is authenticated and the encryption circuit 110 is enabled. The expected device identifier may be hardwired into the integrated circuit 100 (including blowing fuses), or it may be stored in non-volatile memory (such as on a disk). According to another embodiment, the expected device identifier can be stored as an encrypted text in the first device 104 and decryption circuitry is employed for decrypting the encrypted text.

Verifying the first device 104 using a unique device identifier prevents an attacker from replacing the first device 104 with a foreign device, thereby protecting against chosen plaintext attacks using foreign devices. However, an attacker may attempt to inspect or alter the first device 104 directly in an attempt to force the encryption circuit 110 to encrypt chosen plaintext. To protect against this type of inspection or alteration, an alternate authentication technique may be employed. For example, as discussed below, the authentication technique can include monitoring variations in spectral characteristics to assist in detecting attempts to inspect or alter the encryption circuit 110 or the first device 104.

In an alternative embodiment, a message authentication code (MAC) implemented within the first device 104 and the integrated circuit 100 is employed for generating the first device authentication signal 124 to verify the first device 104. Any suitable technique for implementing the MAC may be employed, such as the well known DES implementation. In particular, the first device 104 comprises a first device secret key for generating an initial MAC over the plaintext 102 to be encrypted by the encryption circuit 110. The initial MAC is transferred to the integrated circuit 100 as the first device authentication signal 124. The first verification circuit 130 within the integrated circuit 100 generates a verification MAC over the plaintext 102 using an internal secret key corresponding to the secret key that was used by the first device 104 to generate the initial MAC. The first verification circuit 130 compares the initial MAC (first device authentication signal 124) to the verification MAC where a match verifies that the first device 104 is authenticated. In this embodiment, the first device authentication signal 124 (i.e., the initial MAC) may be observable by an attacker, but the secret keys and operation of the encryption algorithm to generate the initial MAC are preferably inaccessible to observation. In this manner, the MAC can deter employing chosen plaintext attacks since the encryption key for generating the MAC over the chosen plaintext must be known in order to generate the first device authentication signal 124.

Referring again to FIG. 1, another embodiment for verifying the first device 104 is to measure certain spectral characteristics of the cryptosystem during manufacturing, wherein the initial spectral signature is stored in an inaccessible area of the integrated circuit 100. During operation, the first device 104 generates an operating spectral signature for the cryptosystem which is transferred to the integrated circuit 100 as the first device authentication signal 124. The operating spectral signature can be transferred as a unique device identifier or included as part of a MAC. The first verification circuit 130 compares the initial spectral signature generated during manufacturing to the operating spectral signature where a match verifies that the first device 104 is authenticated. Attempts to inspect or alter the cryptosystem, including attempts to induce errors by heating or irradiating the cryptosystem, will induce detectable changes in the spectral signature which will disable the encryption circuitry 110.

State Machine Control

Figure 2A:
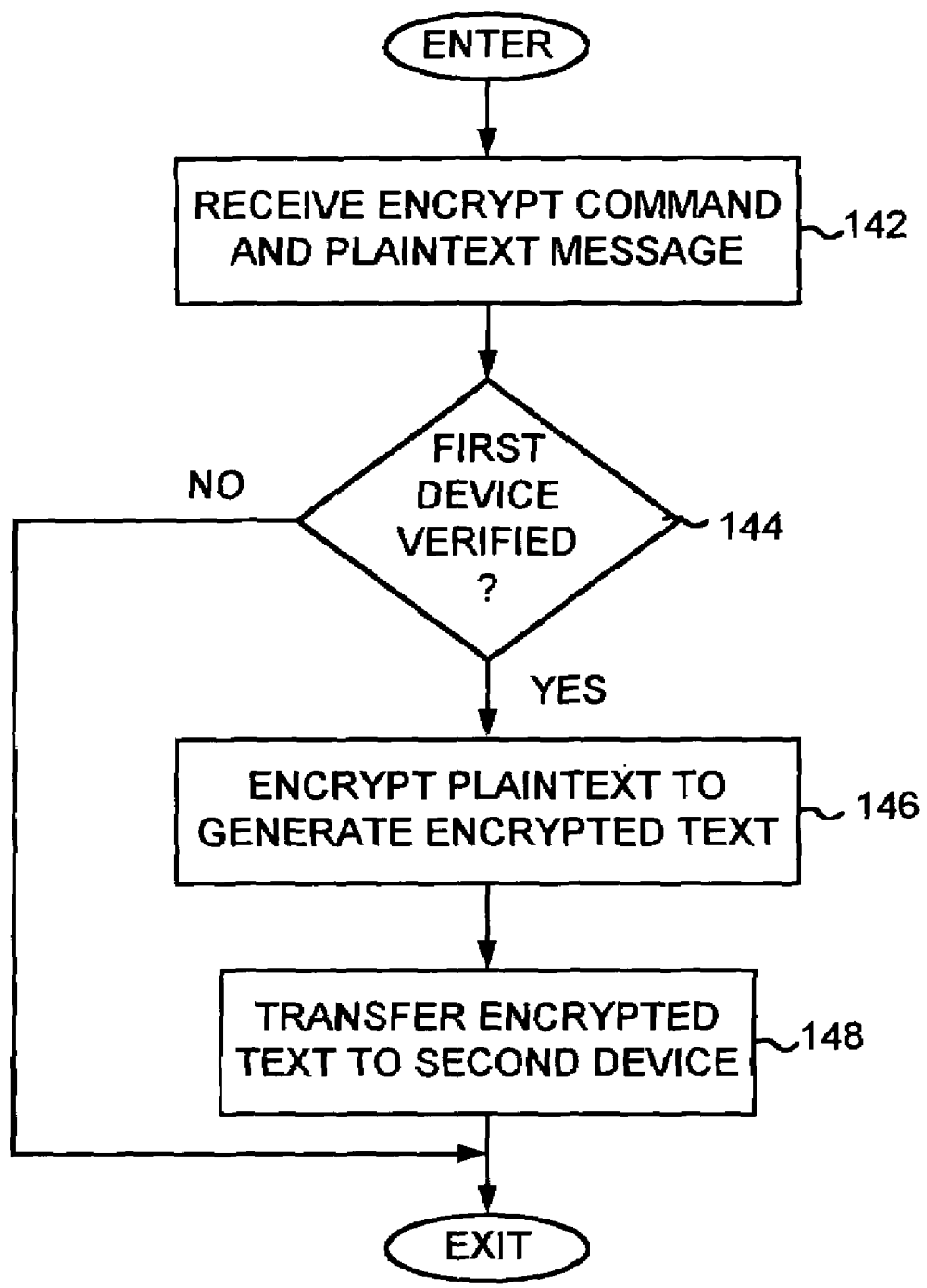
FIG. 2A shows a flow diagram for an embodiment of the present invention wherein an encryption operation is enabled by verifying a first device.
Figure 2B:
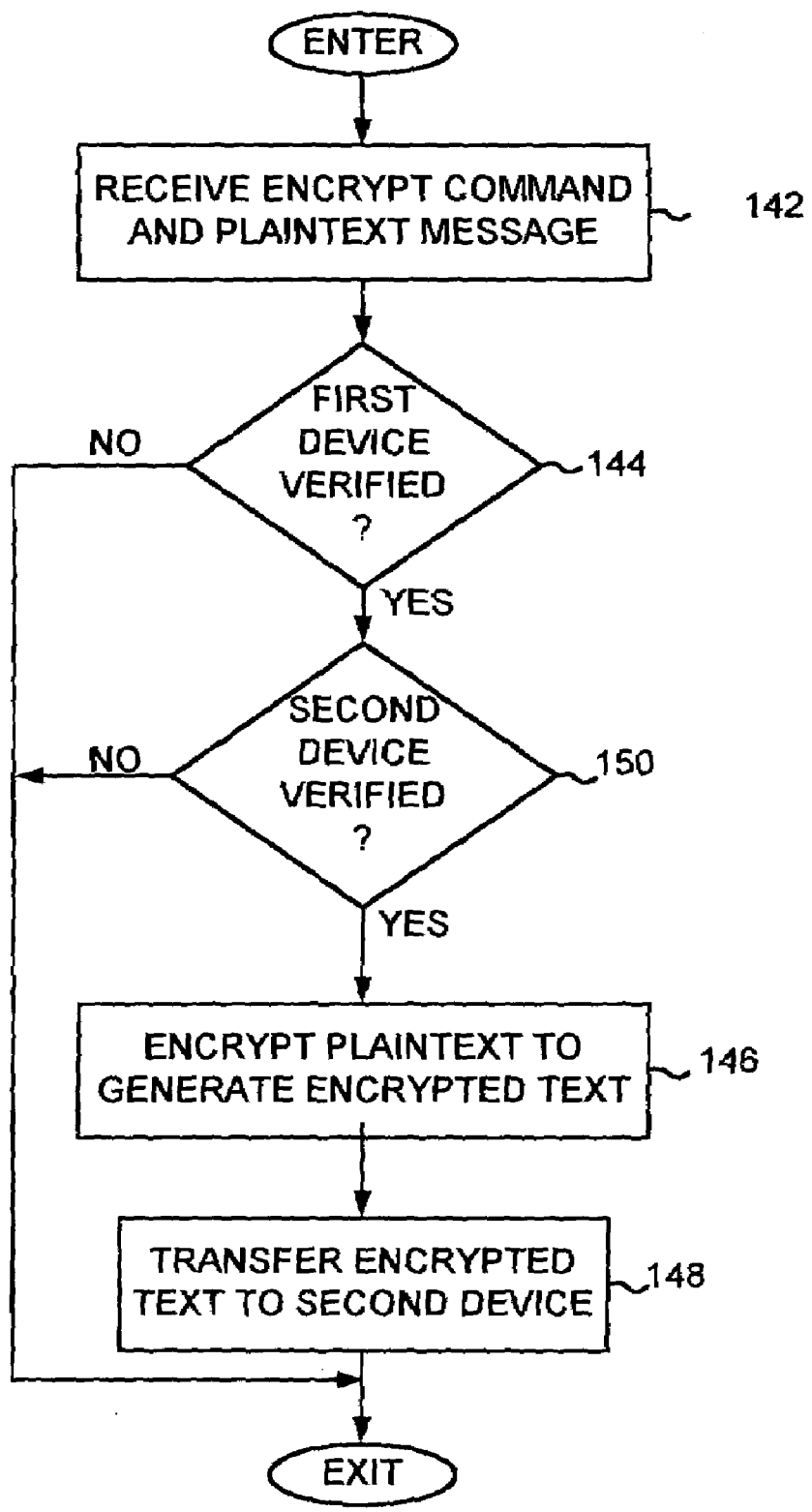
FIG. 2B shows a flow diagram for an alternative embodiment of the present invention wherein the encryption operation is enabled by verifying the first device and by verifying a second device, wherein the encrypted data is generated and sent to the second device only if both devices are verified.

In one embodiment, the integrated circuit 100 comprises state machine circuitry for implementing the device verification used to enable the encryption circuitry 110. The state machine circuitry operates according to the flow diagrams set forth in FIGS. 2A and 2B. At step 142 the state machine receives a command from an authenticated client to encrypt plaintext. At step 144 a branch is executed based on whether the first device 104 is verified. The device verification may be implemented, for example, as described above. If the first device 104 is verified at step 144, then at step 146 the encryption circuitry 110 is enabled by the gating circuit 138 and the plaintext is encrypted. The resulting encrypted data is then transferred at step 148 to the second device 108. If the first device 104 is not verified at step 144, then the encryption circuitry 110 is not enabled. FIG. 2B shows a flow diagram similar to that of FIG. 2A with the additional step 150 of verifying the second device 108 before gating circuit 138 enables the encryption circuitry 110.

I claim:

1. An integrated circuit for selectively encrypting plaintext data received from a first device to produce encrypted data to send to a second device, the integrated circuit comprising:
    controllable encryption circuitry comprising:
        a data input;
        an enable input;
        a data output;
        a plaintext input for providing the plaintext data to the data input;
        an encrypted text output for providing the encrypted data from the data output;
        a first control input for receiving a first device authentication signal for authenticating the first device; and
        a first verification circuit, responsive to the first device authentication signal, for producing a first verification signal for use in controlling the enable input of the encryption circuitry to enable the encryption circuitry to provide the encrypted data via the encrypted text output.

2. The integrated circuit as recited in claim 1, further comprising:
    a second control input for receiving a second device authentication signal authenticating the second device;
    a second verification circuit responsive to the second device authentication signal for producing a second verification signal; and
    a gating circuit responsive to the first and second verification signals for applying an enable signal to the enable input to cause the controllable encryption circuitry to provide the encrypted data via the encrypted text output.

3. The integrated circuit as recited in claim 1, wherein:
    the first device authentication signal comprises a device identifier; and
    the first verification circuit verifies the first device by comparing the device identifier to a corresponding expected device identifier.

4. The integrated circuit as recited in claim 3, wherein the expected device identifier is hardwired into the integrated circuit.

5. The integrated circuit as recited in claim 3, wherein:
    the second device is a non-volatile memory; and
    the expected device identifier is stored on the non-volatile memory.

6. The integrated circuit as recited in claim 1, wherein:
    the first device authentication signal comprises a message authentication code generated over the plaintext data using a device key; and
    the first verification circuit verifies the first device by verifying the message authentication code using an internal key.

7. The integrated circuit as recited in claim 1, wherein:
    the first device is a signal processing circuit; and
    the second device is a non-volatile memory.

8. A method of controlling encryption circuitry within an integrated circuit by selectively encrypting plaintext data received from a first device to produce encrypted data to send to a second device, the method comprising the steps of:
    receiving the plaintext data from the first device;
    receiving a first device authentication signal for authenticating the first device;
    producing a first verification signal in response to the first device authentication signal; and
    enabling the encryption circuitry in response to the first verification signal to provide the encrypted data to the second device.

9. The method of controlling encryption circuitry as recited in claim 8, further comprising the steps of:
    receiving a second device authentication signal authenticating the second device;
    producing a second verification signal in response to the second device authentication signal; and
    enabling the encryption circuitry in response to the first and second verification signals to provide the encrypted data to the second device.

10. The method of controlling encryption circuitry as recited in claim 8, wherein:
    the first device authentication signal comprises a device identifier; and
    the step of producing a first verification signal in response to the first device authentication signal comprises the step of comparing the device identifier to a corresponding expected device identifier.

11. The method of controlling encryption circuitry as recited in claim 10, wherein the expected device identifier is hardwired into an integrated circuit.

12. The method of controlling encryption circuitry as recited in claim 10, wherein:
the second device is a non-volatile memory; and
the expected device identifier is stored on the non-volatile memory.

13. The method of controlling encryption circuitry as recited in claim 8, wherein:
the first device authentication signal comprises a message authentication code generated over the plaintext data using a device key; and
the step of producing a first verification signal in response to the first device authentication signal comprises the step of verifying the message authentication code using an internal key.

14. The method of controlling encryption circuitry as recited in claim 8, wherein:
the first device is a signal processing circuit; and
the second device is a non-volatile memory.

* * * * *